United States Patent
Kim et al.

(10) Patent No.: US 8,923,800 B2
(45) Date of Patent: Dec. 30, 2014

(54) METHOD AND APPARATUS FOR RECEIVING AND PROVIDING DISASTER INFORMATION

(75) Inventors: Sei-kwon Kim, Yongin-si (KR); Hong-soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/183,956

(22) Filed: Jul. 15, 2011

(65) Prior Publication Data

US 2012/0190295 A1 Jul. 26, 2012

(30) Foreign Application Priority Data

Jan. 20, 2011 (KR) .................. 10-2011-0005992

(51) Int. Cl.
- H04M 11/04 (2006.01)
- G06Q 10/06 (2012.01)
- G06Q 50/26 (2012.01)
- H04W 4/02 (2009.01)
- H04W 4/22 (2009.01)
- G08B 21/10 (2006.01)
- H04L 29/08 (2006.01)

(52) U.S. Cl.
CPC .............. H04W 4/22 (2013.01); G06Q 10/06 (2013.01); G06Q 50/26 (2013.01); H04W 4/021 (2013.01); G08B 21/10 (2013.01); H04L 67/26 (2013.01)
USPC ............ 455/404.1; 455/404.2; 455/456.1; 455/466; 455/521; 379/45

(58) Field of Classification Search
USPC ............... 455/521, 404.1–404.2, 456.1–457, 455/414.1–414.3, 517–519; 379/45
IPC ......... H04W 4/22,76/007, 4/12; H04N 21/4882
See application file for complete search history.

(56) References Cited

U.S. PATENT DOCUMENTS

| | | | |
|---|---|---|---|
| 6,385,302 B1 * | 5/2002 | Antonucci et al. | 379/45 |
| 7,212,111 B2 * | 5/2007 | Tupler et | 340/539.18 |
| 7,233,781 B2 * | 6/2007 | Hunter et al. | 455/404.1 |
| 7,245,900 B1 * | 7/2007 | Lamb et al. | 455/404.1 |
| 7,340,241 B2 * | 3/2008 | Rhodes et al. | 455/404.1 |
| 8,300,560 B2 * | 10/2012 | Nowlan et al. | 370/270 |
| 8,489,063 B2 * | 7/2013 | Petite | 455/404.1 |
| 2003/0162557 A1 * | 8/2003 | Shida | 455/521 |
| 2007/0111702 A1 * | 5/2007 | Sanzelius et al. | 455/404.1 |
| 2009/0124232 A1 * | 5/2009 | D'Arcy et al. | 455/404.2 |
| 2009/0286505 A1 * | 11/2009 | Kirk | 455/404.2 |
| 2010/0250111 A1 * | 9/2010 | Gutierrez et al. | 701/200 |
| 2014/0221016 A1 * | 8/2014 | Lee et al. | 455/456.3 |

* cited by examiner

Primary Examiner — Sharad Rampuria
(74) Attorney, Agent, or Firm — Sughrue Mion, PLLC

(57) ABSTRACT

A method and apparatus for receiving and providing disaster information. The method of providing the disaster information includes: classifying a disaster service district into a plurality of emergency zones according to a danger level; transmitting information regarding the plurality of emergency zones to at least one mobile terminal located within the plurality of emergency zones, and receiving a location of the at least one mobile terminal from the at least one mobile terminal; and sequentially transmitting disaster information according to the danger level, to the at least one mobile terminal in the plurality of emergency zones, based on the location of a disaster which has been received from a disaster information server, when a disaster occurs.

17 Claims, 6 Drawing Sheets

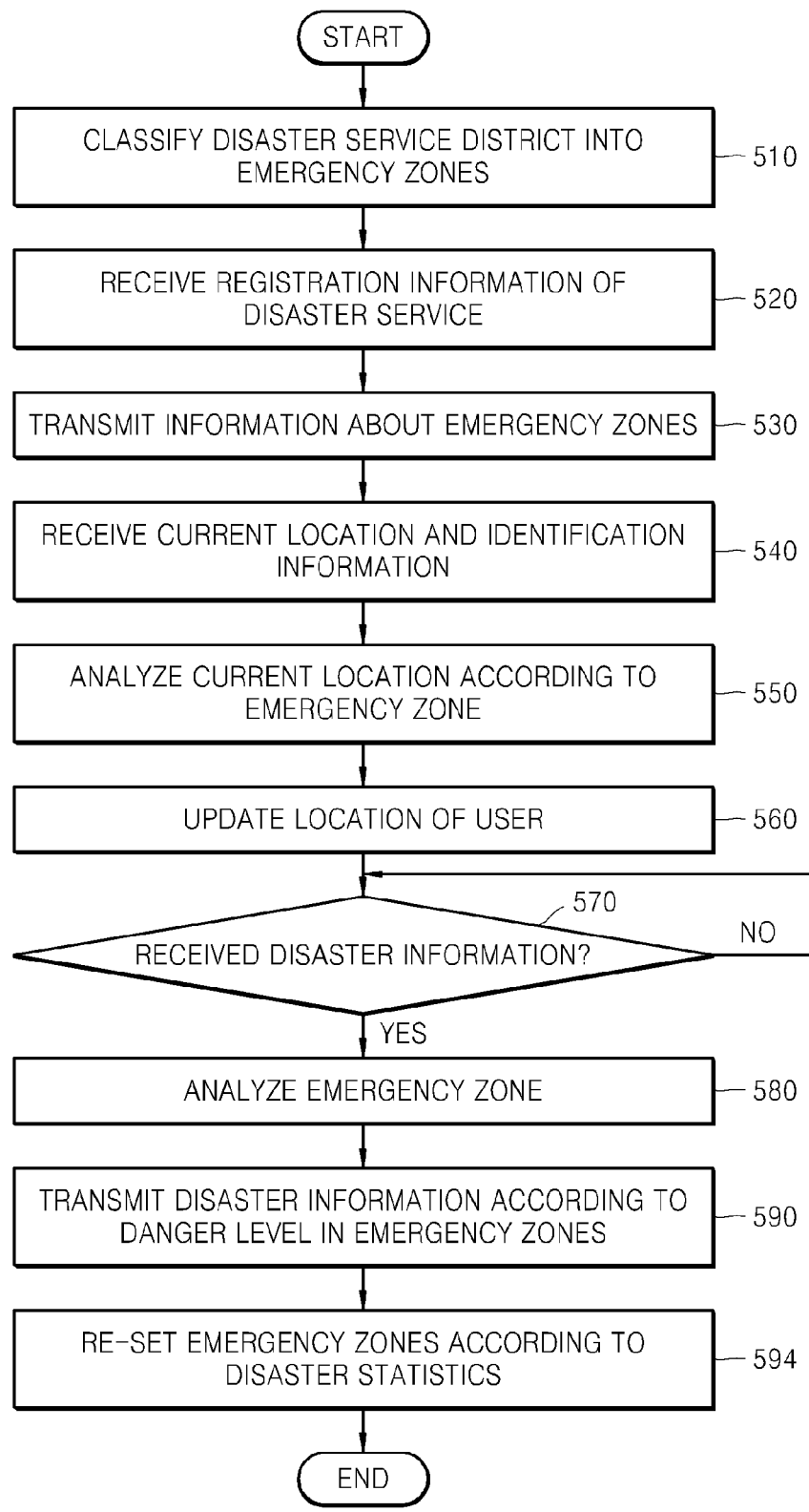

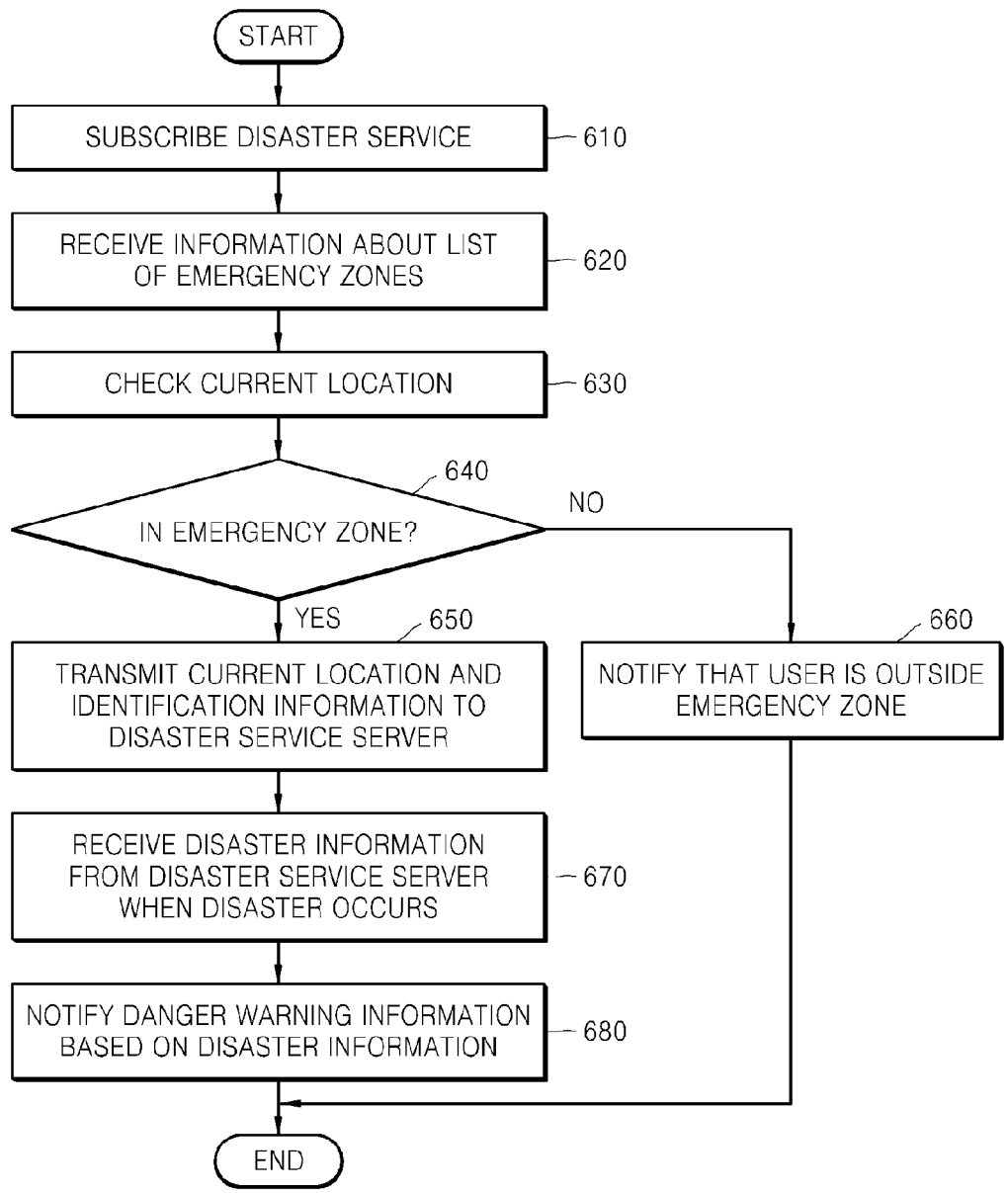

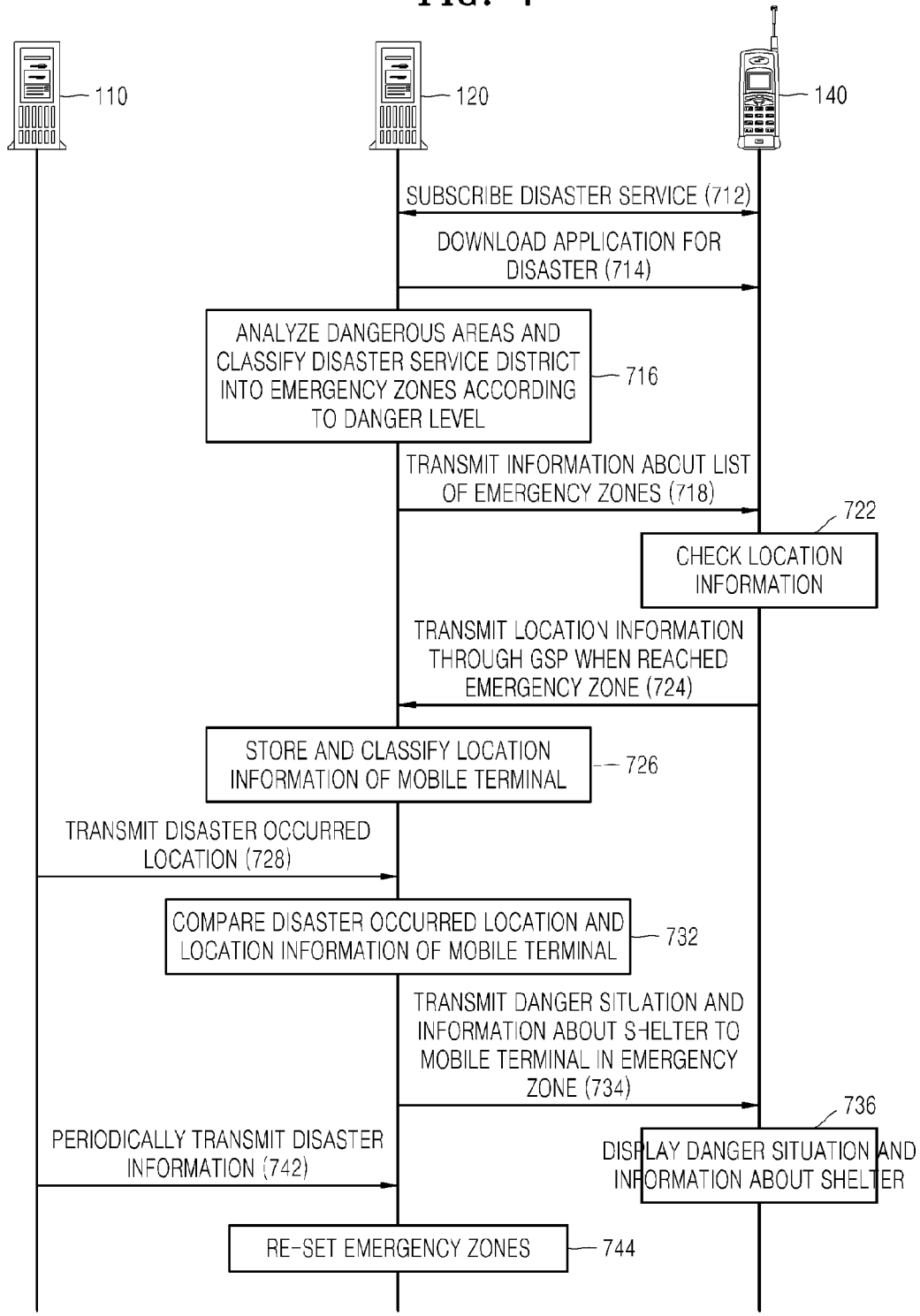

METHOD AND APPARATUS FOR RECEIVING AND PROVIDING DISASTER INFORMATION

CROSS-REFERENCE TO RELATED PATENT APPLICATION

This application claims the benefit of Korean Patent Application No. 10-2011-0005992, filed on Jan. 20, 2011, in the Korean Intellectual Property Office, the disclosure of which is incorporated herein by reference in its entirety.

BACKGROUND

1. Field

The present inventive concept relates to a method and apparatus for receiving and providing disaster information to and from a communication device, in a machine-to-machine (M2M) environment.

2. Description of the Related Art

Recently, machine-to-machine (M2M) technology has come to the fore front as various wireless networks appeared, wireless network coverage increased, the price of communication modules decreased, and the use of various sensor technologies expanded. Telecommunications companies are paying close attention to M2M technologies due to the saturation of the existing mobile phone market. Because the cost of voice communication has dropped, and it is necessary to meet demands for increased data sales and discover new services which will increase transmission capacity according to the introduction of a next generation network.

As a result, it is important to provide disaster warnings to communication devices located near an area where a dangerous situation has occurred.

SUMMARY

The present inventive concept provides a method and apparatus for receiving and providing disaster information to and from a mobile terminal, based on received location data of a global positioning system (GPS).

According to an exemplary embodiment, there is provided a method of providing disaster information, the method including: classifying a disaster service district into a plurality of emergency zones according to a danger level; transmitting information about the plurality of emergency zones to at least one mobile terminal in the plurality of emergency zones, receiving a location of the at least one mobile terminal from the at least one mobile terminal; and sequentially transmitting disaster information according to the danger level, to the at least one mobile terminal in the plurality of emergency zones, based on the location of a disaster which has occurred, and received from a disaster information server, when a disaster occurs.

The plurality of emergency zones may be re-set according to a danger level whenever disaster information is received from the disaster information server.

The sequential transmission of the disaster information may include: comparing the disaster occurrence location with the location of at least one mobile terminal; and sequentially transmitting the disaster information from a first emergency zone having the highest danger level to an nth emergency zone having the lowest danger level, based on the result of the comparison.

The disaster information may include information regarding a current dangerous situation, and information about a shelter for avoiding the disaster.

The method may further include analyzing the location of at least one mobile terminal according to the plurality of emergency zones, and updating location information of the at least one mobile terminal based on the analyzed location of at least one mobile terminal.

According to an exemplary embodiment, there is provided a method of receiving disaster information, the method including: determining a current location of a mobile terminal by using a global positioning system (GPS); checking whether the current location is in an emergency zone which is pre-set by a disaster service server; in response to the current location being in the emergency zone, transmitting identification information and the current location to the disaster service server; and upon receiving from the disaster service server disaster information corresponding to the current location of the mobile terminal, notifying the mobile terminal of a current dangerous situation and notifying a shelter based on the disaster information.

The current location may be updated according to both a predetermined time and a predetermined distance.

The identification information may include at least one of a phone number, an internet protocol (IP), and an email address.

The current dangerous situation and the shelter may be displayed in characters on a screen and/or are provided with voice notification.

The method may further include, in response to a user being outside the pre-set emergency zone, transmitting a notification message to the disaster service server for notifying the disaster service that the user is outside the pre-set emergency zone.

The notification of the current dangerous situation and the shelter may include extracting the current dangerous situation and a location of the shelter from the disaster information, and notifying the mobile terminal and the shelter through a screen and/or through voice notification.

According to another exemplary embodiment, there is provided an apparatus for providing disaster information, the apparatus including: an emergency zone classifying unit which classifies a disaster service district into a plurality of emergency zones according to disaster statistics; a user data managing unit which manages user data of at least one mobile terminal located in one of the plurality of emergency zones; and a disaster information processing unit which sequentially transmits disaster information to the at least one mobile terminal according to a danger level, based on a location of a disaster which occurred which is received from a disaster information server.

The user data may include at least one of a location, a phone number, and subscription information of the at least one mobile terminal.

The disaster information processing unit may transmit information about the plurality of emergency zones to the at least one mobile terminal that is within the plurality of emergency zones, receive a location of the at least one mobile terminal from the at least one mobile terminal, and sequentially transmit the disaster information according to the danger level, to the at least one mobile terminal based on the location where the disaster occurred, which was received from the disaster information server.

According to another exemplary embodiment, there is provided an apparatus for receiving disaster information, the apparatus including: a location checking unit for checking a current location by using a global positioning system (GPS); and a control unit for transmitting identification information and the current location to a disaster service server in response to a current location corresponding to an emergency zone set by the disaster service server; and upon receiving disaster information from the disaster service server, generating danger warning information which corresponds to the disaster information.

The control unit may extract a current dangerous situation and information about a shelter from the disaster information, and generate, using characters and/or voice notification, danger warning information which includes the current dangerous situation and information regarding the shelter.

BRIEF DESCRIPTION OF THE DRAWINGS

The above and other features and advantages of the present inventive concept will become more apparent by describing in detail exemplary embodiments thereof with reference to the attached drawings in which:

FIG. 5 is a flowchart illustrating a method of providing disaster information, performed by a disaster service server, according to an exemplary embodiment;

FIG. 6 is a flowchart illustrating a method of receiving disaster information, performed by a mobile terminal, according to an exemplary embodiment; and FIG. 7 is a diagram for describing operations of a disaster information server, a disaster service server, and a mobile terminal, for receiving and providing disaster information.

DETAILED DESCRIPTION

Hereinafter, the present inventive concept will be described more fully with reference to the accompanying drawings, in which exemplary embodiments are shown.

Figure 1:
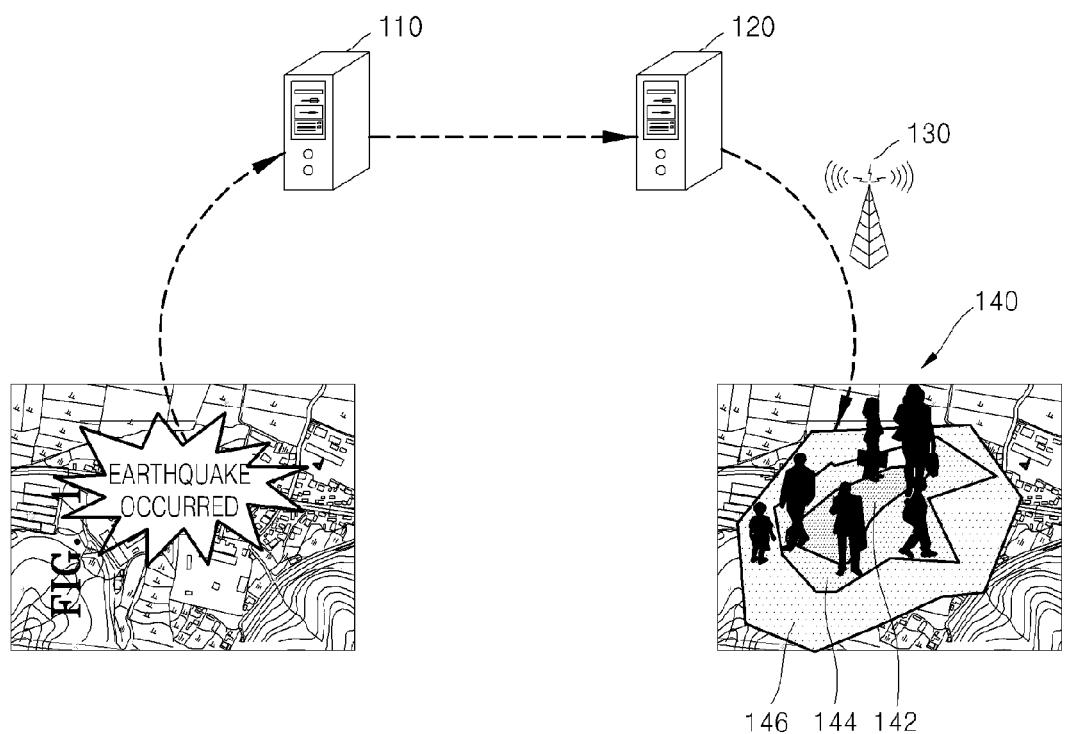
FIG. 1 is a diagram schematically illustrating a network system for receiving and providing disaster information, according to an exemplary embodiment.

FIG. 1 is a diagram schematically illustrating a network system for providing and receiving disaster information, according to an exemplary embodiment.

Referring to FIG. 1, the network system includes a disaster information server 110, a disaster service server 120, a base station 130, and at least one mobile terminal 140.

Disaster information server 110 observes and analyzes a disastrous situation, such as an earthquake or tsunami, and provides disaster information upon occurrence of a disaster. For example, disaster information server 110 may be an earthquake and tsunami analyzing system in a weather center, or a forest administration information system for managing a forest fire or a landslide, but is not limited thereto.

Disaster service server 120 sets dangerous and safe areas based on disaster statistics, transmits information about an emergency zone toat least one mobile terminal 140, receives and manages a location of mobile terminal 140 in the emergency zone, and sequentially transmits disaster information to at least one mobile terminal 140 in the emergency zone according to a level of danger, based on a location of a disaster which has been received from disaster information server 110.

Base station 130 relays a short message service (SMS) or a multi-media message service (MMS) between disaster service server 120 and at least one mobile terminal 140.

A current location of mobile terminal 140 is checked by using a global positioning system (GPS), and when mobile terminal 140 is in an emergency zone pre-set by disaster service server 120, mobile terminal 140 transmits both identification information and the current location to disaster service server 120. Upon receiving the disaster information from disaster service server 120, mobile terminal 140 provides to a user notification of a current dangerous situation as well as a location of a shelter, based on the disaster information.

Mobile terminals 140 each include a mobile communication module and a GPS, and are located in pre-set emergency zones; for example, in one of a first emergency zone 142, a second emergency zone 144, and a third emergency zone 146.

Next, an embodiment of receiving and providing disaster information through the use of the network system of FIG. 1, will be described.

First, when an earthquake occurs, disaster information server 110 detects both an emergency situation and a disaster occurrence which correspond to the earthquake, and transmits the fact that a disaster has occurred location to disaster service server 120.

Disaster service server 120 sequentially transmits both disaster related information and safe area information to mobile terminals 140 in the pre-set emergency zones, for example, the first through third emergency zones 142 through 146, by using an SMS or MMS, through base station 130.

Accordingly, mobile terminal 140 notifies a user located in the pre-set emergency zone regarding the occurrence of the earthquake and the location of the shelter, by using the disaster related information.

Figure 2:
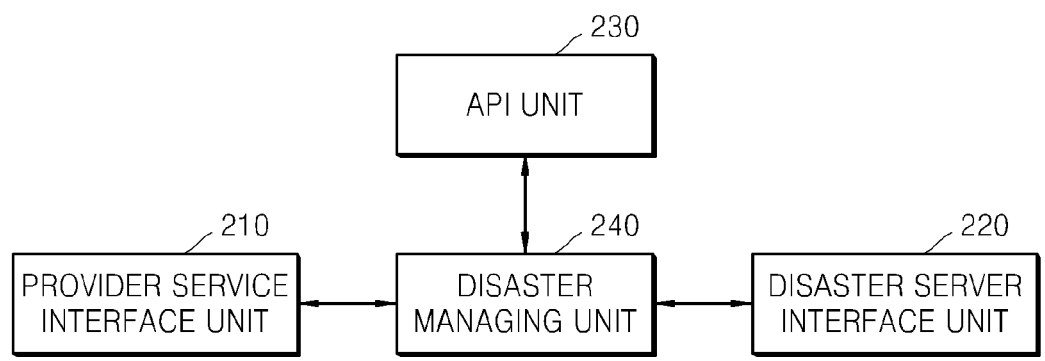
FIG. 2 is a block diagram illustrating in detail a disaster service server of FIG. 1.

FIG. 2 is a block diagram illustrating, in detail, disaster service server 120 of FIG. 1.

Referring to FIG. 2, the disaster service server 120 includes a provider service interface unit 210, a disaster server interface unit 220, an application programming interface (API) unit 230, and a disaster managing unit 240.

Provider service interface unit 210 manages a communication error between disaster managing unit 240 and a network provider. Provider server interface unit 210 performs a third generation (3G) communication connection.

Disaster server interface unit 220 relays data between disaster information server 110 and disaster managing unit 240.

The API unit 230 relays data between disaster managing unit 240 and mobile terminal 140.

Disaster managing unit 240 transmits a list of the emergency zones to mobile terminals 140 through API unit 230, receives the locations of the mobile terminals 140 in the emergency zones, receives the location where the disaster occurred from disaster information server 110 through disaster server interface unit 220, and connects through a 3G communication with the network provider through provider service interface unit 210.

Figure 3:
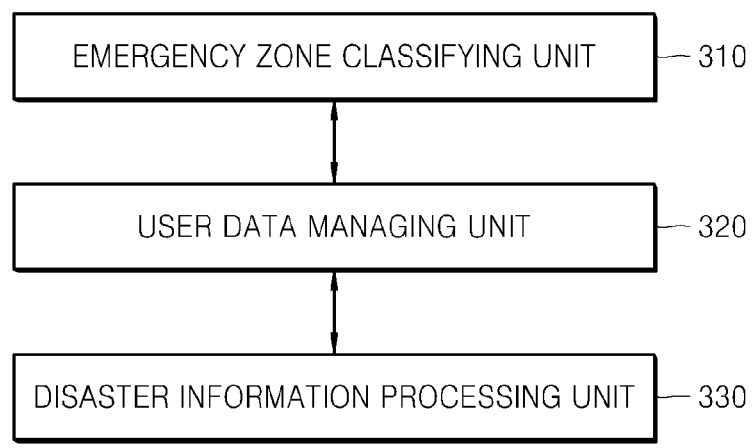
FIG. 3 is a block diagram illustrating in detail a disaster managing unit of FIG. 2.

FIG. 3 is a block diagram illustrating in detail disaster managing unit 240 of FIG. 2.

Referring to FIG. 3, disaster managing unit 240 includes an emergency zone classifying unit 310, a user data managing unit 320, and a disaster information processing unit 330.

Emergency zone classifying unit 310 classifies a disaster service district into a plurality of emergency zones, according to the disaster statistics.

User data managing unit 320 manages user data, such as a user location, a telephone number and subscription information of mobile terminal 140.

Disaster information processing unit 330 sequentially transmits the disaster information to the mobile terminals in the emergency zones according to the danger level, wherein the emergency zones are pre-set based on the disaster location received from disaster information server 110.

Figure 4:
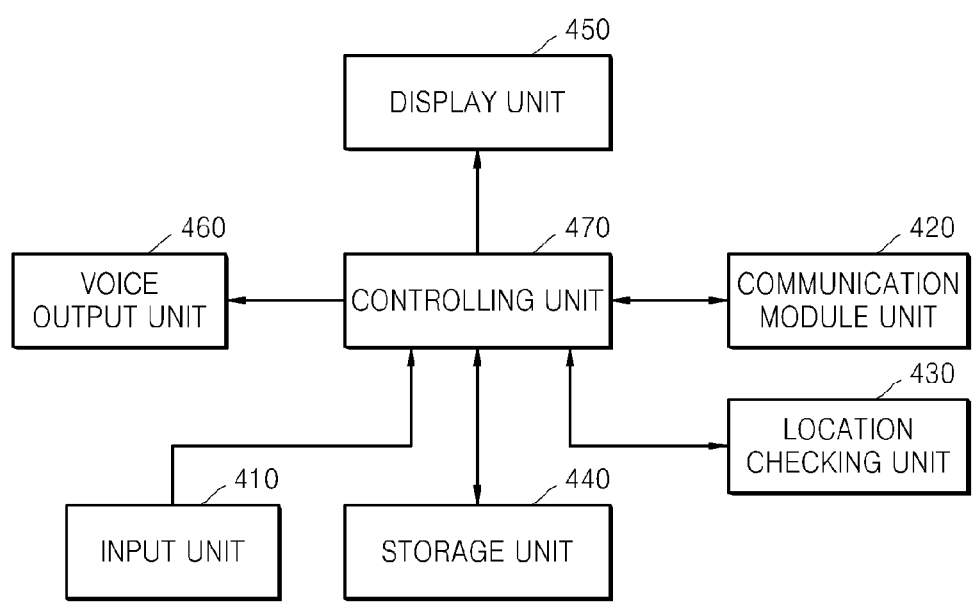
FIG. 4 is a block diagram illustrating in detail a mobile terminal of FIG. 1.

FIG. 4 is a block diagram illustrating in detail mobile terminal 140 of FIG. 1.

Referring to FIG. 4, mobile terminal 140 includes an input unit 410, a communication module unit 420, a location checking unit 430, a storage unit 440, a display unit 450, a voice output unit 460, and a control unit 470.

Input unit 410 includes a plurality of number keys and a plurality of functional keys for performing various functions, and outputs, to control unit 470, key data generated via manipulation of a key or keys by the user.

Communication module unit 420 enables mobile terminal 140 to communicate, via a network, with an external device; and may include, for example, a 3G module or a wireless fidelity (Wi-Fi) module. Communication module unit 420 transmits the location information to disaster service server 120, and receives disaster information from disaster service server 120.

Location checking unit 430 checks the current location of mobile terminal 140 by using a GPS. For example, location checking unit 430 may include a GPS module to check a longitude, a latitude, etc. of mobile terminal 140.

Storage unit 440 stores data required for a control operation of control unit 470, or stores the list of emergency zones received through communication module unit 420. Storage unit 440 may be a magnetic recording medium, such as a hard disk, or a nonvolatile memory, such as an electrically erasable and programmable read only memory (EEPROM) or a flash memory, but is not limited thereto.

Display unit 450 displays a message corresponding to information about the shelter, which is generated by control unit 470, or a manipulation command input from input unit 410.

Display unit 450 may be a liquid crystal display (LCD), but is not limited thereto.

Voice output unit 460 outputs the message regarding the shelter information by voice emitted through a speaker.

Control unit 470 controls display unit 450, communication module unit 420, and location checking unit 430. In particular, control unit 470 checks whether the current location checked by location checking unit 430 corresponds to the pre-set emergency zone. Upon correspondence between the current location and the emergency zone, location checking unit 430 transmits both the identification information and the current location of the mobile terminal 140 both to disaster service server 120 through communication module unit 420. Upon receiving the disaster information and the information regarding the shelter from disaster service server 120, control unit 470 notifies the user of the dangerous situation and the location of the shelter through display unit 450 and/or voice output unit 460.

FIG. 5 is a flowchart illustrating a method of providing disaster information, performed by disaster service server 120, according to an exemplary embodiment.

First, disaster service server 120 needs to manage the disaster which has occurred so as to protect people from the disaster.

Accordingly, disaster service server 120 classifies the disaster service district into the plurality of emergency zones in operation 510. The emergency zones may be dynamically set according to either disaster statistics or by an operator operating the disaster service server 120. For example, the disaster service district may be classified into a first emergency zone, a second emergency zone, and a third emergency zone according to a dangerous level, to provide both efficient network management and efficient disaster management.

Then, in operation 520 disaster service server 120 receives registration information of a disaster service from the at least one mobile terminal 140.

Next, in operation 530, disaster service server 120 transmits information about the list of emergency zones to all mobile terminals 140 registered in the disaster service.

Then, disaster service server 120 periodically receives in operation 540, both the current location and identification information from the at least one mobile terminal 140.

Then, in operation 550, disaster service server 120 analyzes the current location of mobile terminal 140 in the emergency zone, by using both the current location of mobile terminal 140 and the identification information. For example, disaster service server 120 determines whether mobile terminal 140 is in the first emergency zone or the second emergency zone etc., by using the current location and the identification information of mobile terminal 140.

Next, in operation 560, disaster service server 120 updates the location of the user in real-time by using the location information of the mobile terminal 140.

Then, in operation 570, disaster service server 120 periodically checks whether the disaster information is received from disaster information server 110. In other words, when a disaster occurs in the emergency zone, disaster service server 120 receives the disaster information form the disaster information server 110.

Next, in operation 580, disaster service server 120 analyzes the emergency zone based on the disaster information received from the disaster information server 110. Here, the disaster information includes disaster situation and the location where the disaster occurred.

Then, in operation 590, disaster service server 120 transmits the disaster information to registered mobile terminals 140, according to the dangerous level of the first through third emergency zones, which are pre-set based on the disaster occurred location. Here, the disaster information includes both the dangerous situation and information regarding the shelter.

The disaster information may be sequentially transmitted to mobile terminals 140 from a first emergency zone having the highest danger level, to an nth emergency zone having the lowest danger level, based on the location of the disaster that occurred.

Here, the disaster information may include any detail that notifies a user of a current dangerous situation. Also, a method of transmitting the disaster information is not limited to using SMS, and the method of transmitting the disaster information may use any method capable of communication, such as a protocol through MMS or a socket, an email, or voice data.

Then, in operation 594, the disaster service server 120 re-sets the emergency zones according to disaster statistics, whenever the emergency zones are generated or whenever disaster information newly estimated by the disaster information server 110 is received.

Consequently, according to the method of the current exemplary embodiment, disaster service server 120 may notify people around the pre-set emergency zones regarding both the dangerous situation and information regarding the shelter, in response to the occurrence of an earthquake, a tsunami, or a forest fire.

FIG. 6 is a flowchart illustrating a method of receiving disaster information, performed by the mobile terminal 140, according to an exemplary embodiment.

In operation 610, mobile terminal 140 transmits the registration information of the disaster service to the disaster service server 120.

In operation 620, mobile terminal 140 receives the information regarding the list of pre-set emergency zones from the disaster service server.

In operation 630, mobile terminal 140 checks the current location by using the GPS. According to an exemplary embodiment, the current location is updated according to either a predetermined time or a predetermined distance.

In operation 640, mobile terminal 140 checks whether the current location corresponds to the emergency zone by comparing the current location and the emergency zone set by disaster service server 120.

In operation 650, in response to a determination that the current location corresponds to the emergency zone, mobile terminal 140 transmits the current location and the identification information to disaster service server 120. Here, the identification information may include a phone number, an IP address, or an email address, but is not limited thereto.

Alternatively, in operation 660, in response to a determination that the current location does not correspond to the emergency zone, mobile terminal 140 notifies the user that the user is outside the emergency zone, via a message and/or voice.

Then, in operation 670, when a disaster occurs, mobile terminal 140 receives the disaster information from disaster service server 120.

Next, mobile terminal 140 notifies the user of danger warning information, based on the disaster information.

The danger warning information may be notified by extracting the dangerous situation and the information regarding the location of the shelter from the disaster information, and notifying the user regarding both the dangerous situation and the location of the shelter, via a screen display and/or by voice notification.

FIG. 7 is a diagram for describing operations of disaster information server 110, disaster service server 120, and mobile terminal 140, to provide and receive the disaster information.

First, when mobile terminal 140 transmits a request to disaster information server in operation 712, to subscribe to the disaster service, disaster information server 110 registers mobile terminal 140.

Mobile terminal 140 then downloads, in operation 714 an application for disaster from disaster information server 110.

In operation 716, disaster service server 120 analyzes dangerous areas in the disaster service district according to disaster statistics, and classifies the disaster service district into the plurality of emergency zones according to the danger level.

Next, in operation 718, disaster service server 120 transmits the information regarding the list of the emergency zones to mobile terminal 140, which is subscribed to the disaster service.

Meanwhile, in operation 722, mobile terminal 140 checks the location information by using the GPS.

Then, in operation 724, when the user has reached the emergency zone, mobile terminal 140 transmits the location information to disaster service server 120, through the GPS.

Next, in operation 726, disaster service server 120 stores and classifies the location information of mobile terminal 140 in a database.

In operation 728, upon detecting emergency and disaster occurrence, disaster information server 110 transmits the location of the disaster to disaster service server 120.

Then, in operation 732, upon receiving the disaster location information from disaster information server 110, disaster service server 120 compares the disaster location information and the information regarding the location of mobile terminal 140.

Next, in operation 734, disaster service server 120 transmits the dangerous situation and the information regarding the shelter to mobile terminal 140 in the emergency zone, according to the result of comparing the disaster location with the location of mobile terminal 740. In other words, disaster service server 120 may sequentially transmit the disaster information, such as the dangerous situation and the information regarding the shelter, to the at least one mobile terminal 140 located in one of the emergency zones, according to the danger level, based on the location where the disaster occurred.

For example, disaster service server 120 notifies mobile terminals 140 in the first emergency zone that is most dangerous, the information regarding the shelter so they can quickly evacuate the area, and then notifies mobile terminals 140 in the second emergency zone of the information regarding the shelter in order for the users with mobile terminals in the second emergency zone to quickly evacuate, and then notifies mobile terminals 140 in the nth emergency zone the information regarding the shelter so they can quickly evacuate, based on the location of the disaster which has occurred.

Then, in operation 736, mobile terminal 140 displays a message or graphic form on a screen, and/or outputs through voice notification, the dangerous situation and the information regarding the shelter based on the disaster information received from disaster service server 120.

Meanwhile, in operation 742, disaster information server 110 periodically transmits the disaster information to the disaster service server 120. In operation 744, disaster service server 120 re-sets the emergency zones, whenever disaster information is received from disaster information server 110.

Accordingly, according to the exemplary embodiments, the people around the pre-set emergency zones can be notified when a dangerous situation occurs and can be notified of the location of the shelter to go to when an earthquake, a tsunami, or a forest fire occurs. Also, since the location when the disaster occurred is determined based on the GPS, the network can be used more accurately and more efficiently in determining a location, as compared with determining the location of where a disaster occurred, based on a cell.

The exemplary embodiments can be written as computer programs and can be implemented by general-use and special purpose digital computers that execute the programs using a computer readable recording medium. Examples of computer readable recording medium include non-transitory magnetic storage media (e.g., ROM, floppy disks, hard disks, etc.), optical recording media (e.g., CD-ROMs, or DVDs), and storage media such as carrier waves (e.g., transmission through the Internet).

While this invention has been particularly shown and described with reference to the exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing disaster information, the method comprising:

classifying a disaster service district into a plurality of emergency zones according to a danger level;

transmitting information regarding the plurality of emergency zones to mobile terminals located within the plurality of emergency zones, and receiving a location of the mobile terminals from the mobile terminals; and sequentially transmitting disaster information according to the danger level of the plurality of emergency zones, first to the mobile terminals in the most dangerous emergency zone within the plurality of emergency zones, based on the location of a disaster which has occurred in the disaster service district, where the location of the disaster is received from a disaster information server, in response to the occurrence of a disaster, wherein the sequentially transmitting of the disaster information comprises comparing the location where the disaster occurred with the location of at least one mobile terminal.

2. The method of claim 1, wherein the plurality of emergency zones are re-set according to the danger level whenever the disaster information is received from the disaster information server.

3. The method of claim 1, wherein the sequentially transmitting of the disaster information comprises:

sequentially transmitting the disaster information from a first emergency zone having the highest danger level to an nth emergency zone having the lowest danger level, based on the result of comparing the location of the disaster with the location of the mobile terminal.

4. The method of claim 1, wherein the disaster information comprises information regarding a current dangerous situation, and information regarding a shelter that a user can go to in order to avoid the disaster.

5. The method of claim 1, further comprising analyzing the location of the mobile terminals according to the plurality of emergency zones, and updating location information of the mobile terminals based on the analyzed location of the mobile terminals.

6. A method of receiving disaster information, the method comprising:

checking a current location by using a global positioning system (GPS);

checking whether the current location is within an emergency zone pre-set by a disaster service server;

in response to the current location being within the emergency zone, transmitting identification information and the current location to the disaster service server; and upon receiving disaster information which corresponds to the current location of the disaster from the disaster service server, notifying a user through their mobile terminal of a current dangerous situation and the location of a shelter which the user can go to in order to avoid the disaster, based on the received disaster information, wherein the emergency zone is one of a plurality of emergency zones obtained by classifying a disaster service district according to a danger level, and the receiving is a sequential receiving of disaster information according to the danger level of the plurality of emergency zones first by the mobile terminals of the most dangerous emergency zone within the plurality of emergency zones, wherein the sequential receiving of the disaster information comprises comparing the location where the disaster occurred with the location of at least one mobile terminal.

7. The method of claim 6, wherein the current location is updated according to at least one of a predetermined time and a predetermined distance.

8. The method of claim 6, wherein the identification information comprises at least one of a phone number, an internet protocol (IP), and an email address.

9. The method of claim 6, wherein the current dangerous situation and the location of the shelter are expressed by at least one of displaying characters on a screen and providing voice notification.

10. The method of claim 6, further comprising, in response to a user being outside the pre-set emergency zone, transmitting a notification message to notify that the user is outside the pre-set emergency zone, which is pre-set by the disaster service server.

11. The method of claim 6, wherein the notifying of the current dangerous situation and the location of the shelter comprises extracting the current dangerous situation and the location of the shelter from the disaster information, and notifying the user of the current location of the dangerous situation and the location of the shelter, by at least one of a display screen and voice notification.

12. An apparatus for providing disaster information, the apparatus comprising:

an emergency zone classifier configured to classify a disaster service district into a plurality of emergency zones, according to disaster statistics;

a user data manager configured to manage user data of mobile terminals located within the plurality of emergency zones; and a disaster information processor configured to sequentially transmit disaster information received from a disaster information server first to the mobile terminals in the most dangerous emergency zone, according to a danger level, based on a location of a disaster which has occurred, wherein the sequentially transmitting of the disaster information comprises comparing the location where the disaster occurred with the location of at least one mobile terminal.

13. The apparatus of claim 12, wherein the user data comprises at least one of a location, a phone number, and subscription information of the mobile terminals located within the plurality of emergency zones.

14. The apparatus of claim 12, wherein the disaster information processor transmits information regarding the plurality of emergency zones to the mobile terminals in the plurality of emergency zones, receives a location of the mobile terminals from the mobile terminals, and sequentially transmits the disaster information received from the disaster information server according to the danger level, to the mobile terminals based on the location of the disaster which has occurred.

15. An apparatus for receiving disaster information, the apparatus comprising:

a location checker configured to check a current location by using a global positioning system (GPS); and a controller configured to transmit identification information and the current location to a disaster service server in response to the current location corresponding to an emergency zone set by the disaster service server, and upon receiving disaster information from the disaster service server, to generate danger warning information which corresponds to the disaster information, wherein the emergency zone is one of a plurality of emergency zones obtained by classifying a disaster service district according to a danger level, and the receiving is a sequential receiving of disaster information according to the danger level of the plurality of emergency zones first by a controller of an apparatus of the most dangerous emergency zone within the plurality of emergency zones, wherein the sequential receiving of the disaster information comprises comparing the location where the disaster occurred with the location of at least one mobile terminal.

16. The apparatus of claim 15, wherein the controller extracts information regarding a current dangerous situation and information about the location of a shelter from the disaster information, and generates information warning of a dangerous situation which has occurred, including the current dangerous situation and the information regarding the location of the shelter, by at least one of displaying characters on a screen, and providing voice notification.

17. A non-transitory computer readable recording medium having recorded thereon a program, wherein the program, when executed by a processor of a computer, causes the computer to execute the method of claim 1.

\* \* \* \* \*